United States Patent
Munechika et al.

(10) Patent No.: US 8,767,233 B2
(45) Date of Patent: *Jul. 1, 2014

(54) MULTI-RESOLUTION SEGMENTED IMAGE SENSOR

(75) Inventors: Stacy M. Munechika, Fairport, NY (US); Christopher B. Liston, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/599,160

(22) Filed: Aug. 30, 2012

(65) Prior Publication Data

US 2014/0063532 A1 Mar. 6, 2014

(51) Int. Cl.
*G06K 15/00* (2006.01)
*G06F 15/00* (2006.01)
*H04N 1/409* (2006.01)
*H04N 1/46* (2006.01)

(52) U.S. Cl.
USPC .......... 358/1.14; 358/1.9; 358/3.26; 358/505; 358/514

(58) Field of Classification Search
USPC .......... 358/1.14, 1.9, 512, 448, 532, 515, 2.1, 358/3.26, 504, 483, 474, 513, 514, 505, 358/486, 463; 348/36, 239, 48, 313, 162, 348/303, 335, 297, 363, 371, 208.99, 348/207.99, 220.1, 222.1, 230.1, 296, 362, 348/367, 281, 307, 294, 272; 382/284, 282, 382/294, 300, 162, 167, 299, 298, 318, 312, 382/274, 275
See application file for complete search history.

(56) References Cited

U.S. PATENT DOCUMENTS

| | | | | | |
|---|---|---|---|---|---|
| 6,009,214 | A | * | 12/1999 | Suggs | 382/312 |
| 6,894,812 | B1 | * | 5/2005 | Spears | 358/483 |
| 2005/0225587 | A1 | * | 10/2005 | Hoffmann et al. | 347/19 |
| 2011/0242187 | A1 | * | 10/2011 | Mongeon et al. | 347/19 |
| 2013/0162748 | A1 | * | 6/2013 | Rzadca et al. | 347/258 |

* cited by examiner

*Primary Examiner* — Ngon Nguyen
(74) *Attorney, Agent, or Firm* — Nelson Adrian Blish

(57) ABSTRACT

A method of detecting and correcting imaging defects in a media printed on a high-speed multi-color printer includes providing a multisensory imaging device (10); illuminating the media; sensing images on the media at high resolution with at least one high resolution sensor (20) as it passes the multisensory imaging device; transmitting an output of the high resolution sensor to a controller (19); sensing images on the media at low resolution with at least one low resolution sensor (24); calculating a correction for stitch; adjusting a timing of image data provided to image writers to align the inkjets to produce an optimal cross-track line; and providing a full page view from the low resolution sensor.

10 Claims, 7 Drawing Sheets

MULTI-RESOLUTION SEGMENTED IMAGE SENSOR

CROSS REFERENCE TO RELATED APPLICATIONS

Reference is made to commonly-assigned, originally filed., copending U.S. patent application Ser. No. 13/599,119, filed Aug. 30, 2012, entitled MULTI-RESOLUTION SEGMENTED IMAGE SENSOR, by Munechika et al.; the disclosure of which is incorporated herein.

FIELD OF THE INVENTION

The present invention relates in general to printing and in particular to low resolution and high resolution sensors for multi-head printers.

BACKGROUND OF THE INVENTION

In large print systems multiple calibrations are performed by sensing the position of printed marks and making adjustments based on the results of these measurements. Often multiple sensors are employed to perform each of the calibrations because the required qualities of the sensors, for example, resolution, differ from application to application.

In a print system with wide receivers it is often necessary to align multiple print elements so they can function as one wide element to span the width of the receiver. For example, in large inkjet printers, multiple 6" wide lineheads are combined to print on 19" or 25" wide paper. Since the lineheads cannot be mounted end to end they are offset from each other in the direction of media travel. To print a straight line of data on the paper, the printing on each linehead must be enabled at different times so that the image is printed in alignment on the receiver. This timing adjustment produces alignment in the direction of media travel.

Due to mechanical tolerances, there must be a certain amount of overlap between lineheads in the cross travel direction. Alignment in the cross travel direction is achieved by selecting the printing elements on which one linehead stops printing and the next linehead starts printing. A method to align the lineheads is to print marks from each linehead, measure the marks, and adjust the exposure timing and overlap pixel for optimal printing. A common method to do this is to use high resolution digital cameras to measure marks from each linehead and make the adjustments.

For a high quality print all the color planes should be printed directly on top of each other. Any error is called misregistration and is unacceptable. To maintain good registration the positions of the colors are measured regularly and adjusted. A final group of functions include the detection of defects such as streaks or missing lines of data and the visualization of images as they are printed.

Current implementations use multiple sensors for these functions. For example, multiple high resolution cameras with small fields of view can be used for the first two functions while a line array with a wide field of view can be used for the third function. It is not practical to acquire the full width at high resolution because it becomes very expensive to handle the large amount of high speed data.

SUMMARY OF THE INVENTION

Briefly, according to one aspect of the present invention, a method of detecting and correcting imaging defects in a media printed on a high-speed multi-color printer includes providing a multi-resolution image sensor; illuminating the media; sensing images on the media at high resolution with at least one high resolution sensor as it passes the multi-resolution image sensor; transmitting an output of the high resolution sensor to a controller; sensing images on the media at low resolution with at least one low resolution sensor; calculating a correction for stitch; adjusting a timing of image data provided to image writers to align the inkjets to produce an optimal cross-track line; and providing a full page view from the low resolution sensor.

This invention presents a novel method and apparatus to combine sensors for multiple control functions. Specifically, this invention provides a means of combining the sensors needed for alignment of the image writer sections (stitch), control of color to color registration, and defect detection and page visualization.

The invention and its objects and advantages will become more apparent in the detailed description of the preferred embodiment presented below.

DETAILED DESCRIPTION OF THE INVENTION

The present invention will be directed in particular to elements forming part of, or in cooperation more directly with the apparatus in accordance with the present invention. It is to be understood that elements not specifically shown or described may take various forms well known to those skilled in the art.

Figure 1:
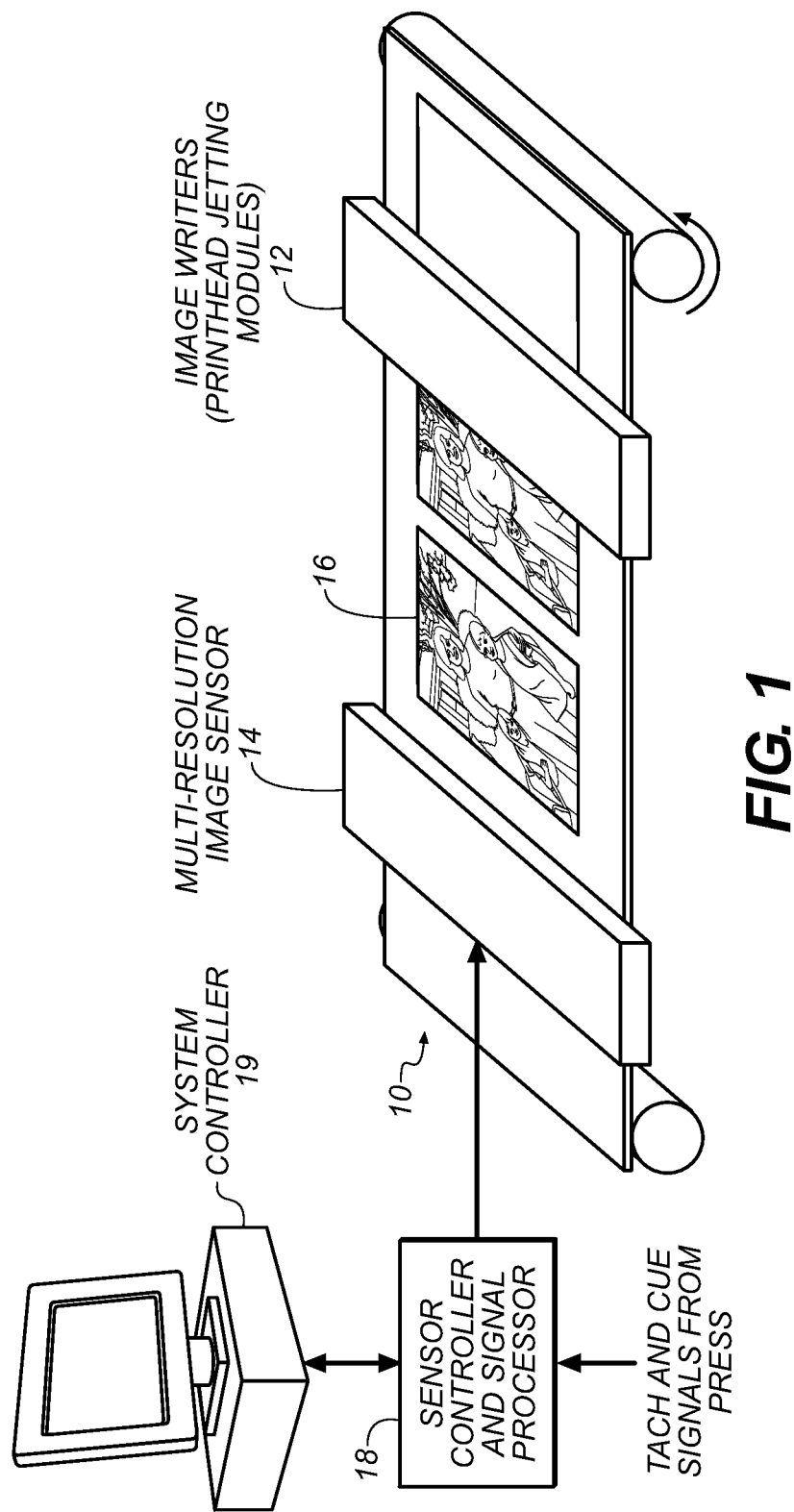
FIG. 1 is a schematic view of a multi-resolution segmented image sensor according to the present invention.

Referring now to FIG. 1 diagrammatically illustrates an ink jet printer 10 with associated jetting modules 12 for printing images 16, and a multi-resolution image sensor (MRIS) 14. The MRIS is oriented to provide full coverage of the printed substrate 16 width as the printed substrate traverses across the MRIS sensing elements 20, shown in FIG. 2. Tach and cue signals from the press machine-control electronics, not shown, provide synchronizing signals to initiate the scanning operation of the MRIS commensurate with a known starting location of the printed substrate.

Figure 2:
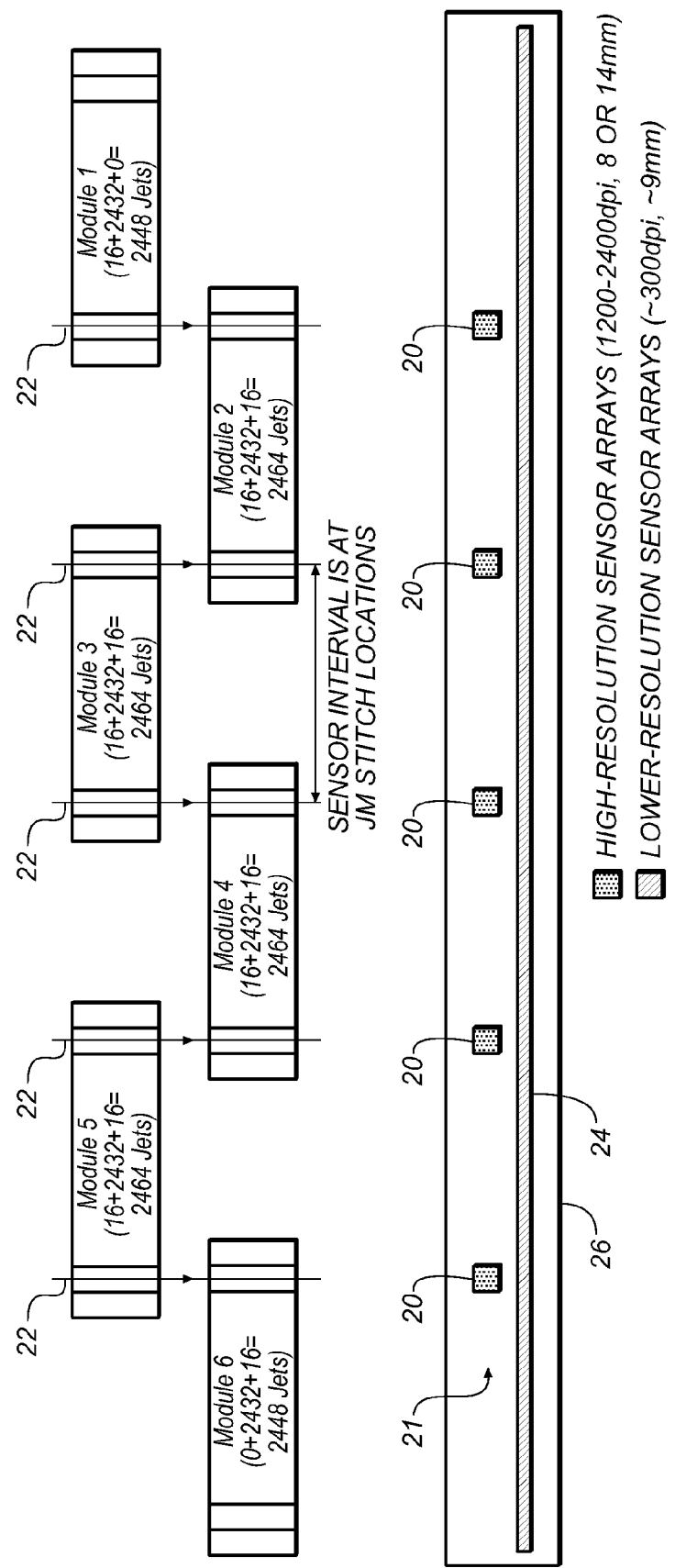
FIG. 2 is a plan view showing printing modules and sensor array according to an embodiment of the present invention.

In one embodiment, the MRIS is comprised of a segmented array of charged-couple devices (CCDs) 20, shown in FIG. 2, that have varying native resolution and are arranged on a common substrate. Electronic data from the MRIS are sent to the sensor controller and signal processor 18, shown in FIG. 1, which relays the processed data to a system controller 19 which utilizes the data for performing writing system (jetting module) adjustments and image display of the printed image.

FIG. 2 depicts an arrangement wherein high-resolution scanning elements 20 form a CCD array 21 (e.g. 1200 dpi) and are linearly arranged in a non-contiguous manner at the jetting-module stitch locations 22. FIG. 2 also shows a contiguous linear arrangement of lower resolution CCD sensors (e.g. 300 dpi) 24 that are in close proximity and arranged parallel to the non-contiguous, high-resolution CCD arrays 20. The arrangement of the lower-resolution CCD arrays is such that the pitch between adjacent elements is constant (e.g. 84.67 microns for 300 dpi). This pitch is maintained across adjacent CCD arrays such that all elements along the active length of the arrays appear at the same resolution with minimal linearity error in the x, y and z directions. In the preferred embodiment, the CCD arrays are bonded to a common substrate material 26 using known die-bonding techniques. The substrate material can be ceramic or a dimensionally stable fiberglass printed-circuit-board substrate material (e.g. FR-4). Appropriate wirebonding techniques can be used to connect the CCD sensors to the conductive traces on the substrate, which in turn connect to the CCD driving circuitry and signal-processing electronics.

Figure 3:
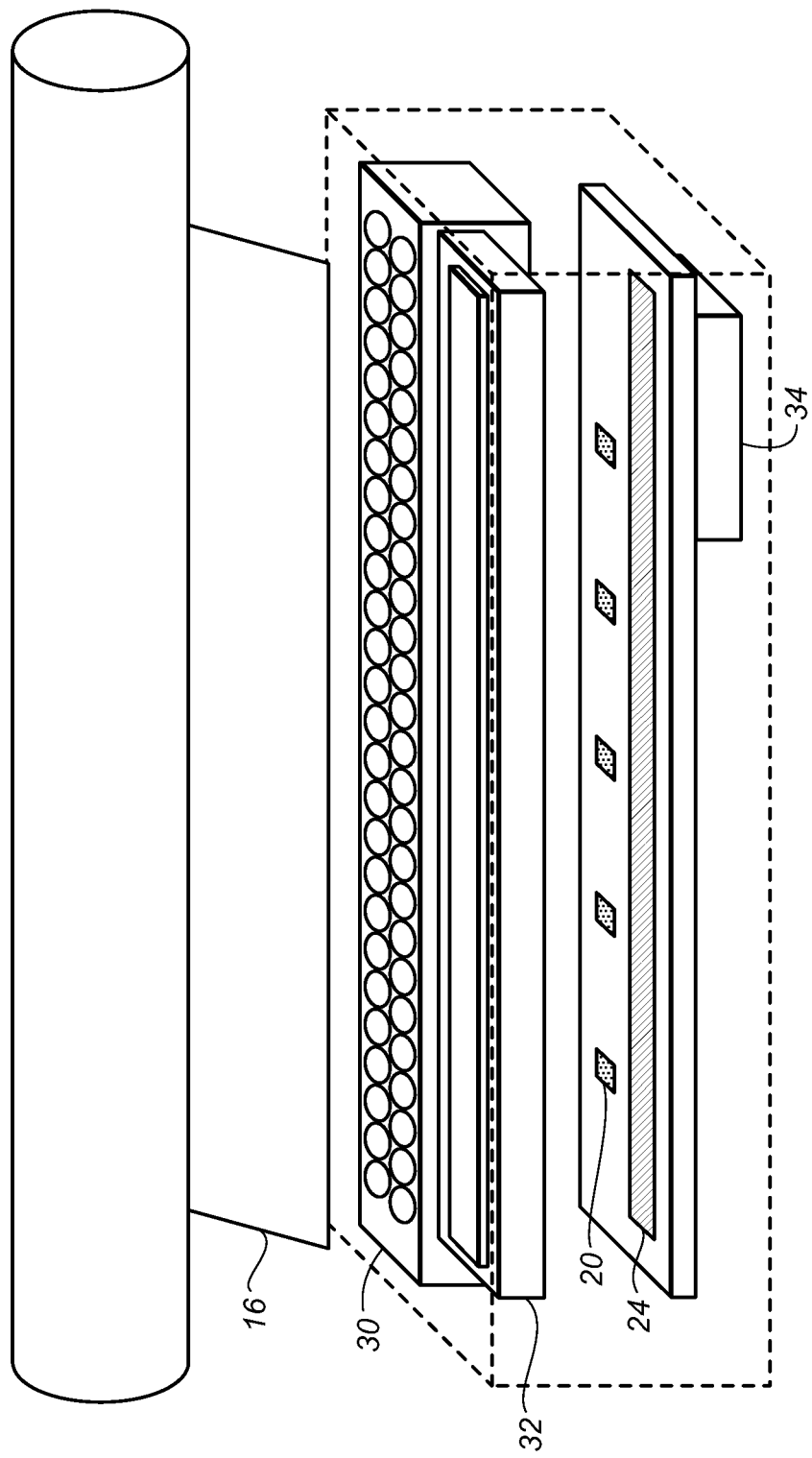
FIG. 3 is a schematic view of a multi-resolution image sensor according to the present invention.

FIG. 3 is a schematic of a multi-resolution image sensor according to the present invention. The use of Selfoc™ gradient-index lenses 30 in the optical design of linear CCD sensors is well known in the scanner industry e.g. industrial contact-image sensor (CIS) technology produced by Tichawa. A common line-illumination source 32 is also positioned to allow for sufficient target illumination along a scan line within the field of view of the CCD sensors. The line-illumination source can be monochromatic, or RGB with associated strobe timing circuitry to allow for activation of the various light sources at the appropriate time. The interface electronics circuitries 34 are used to control the sensor data and relay the acquisition timing from the sensor controller 18. In one embodiment, interface circuitry 34 is compliant with standard camera sensor interface protocols such as CameraLink.

Figure 4:
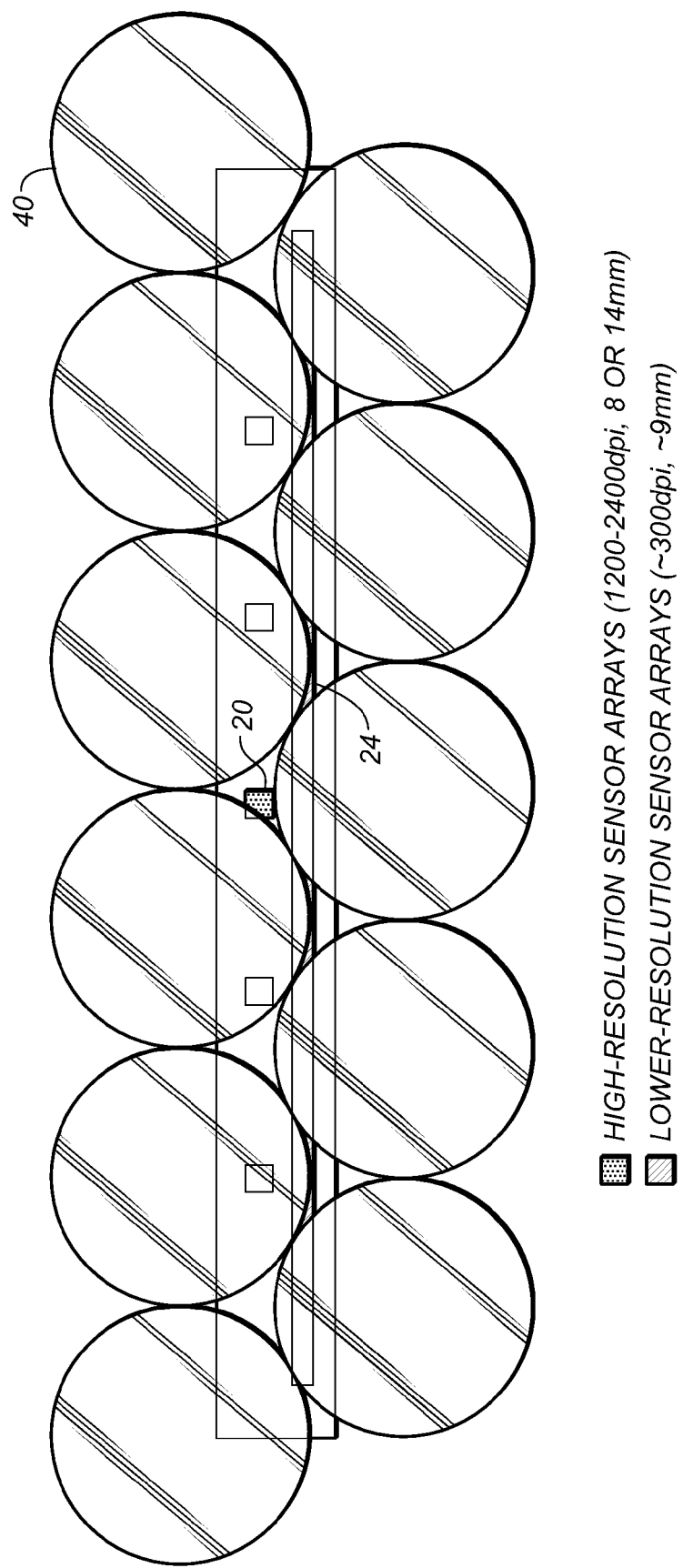
FIG. 4 is a plan view, partially in phantom, of the present invention with a lens array.
Figure 5:
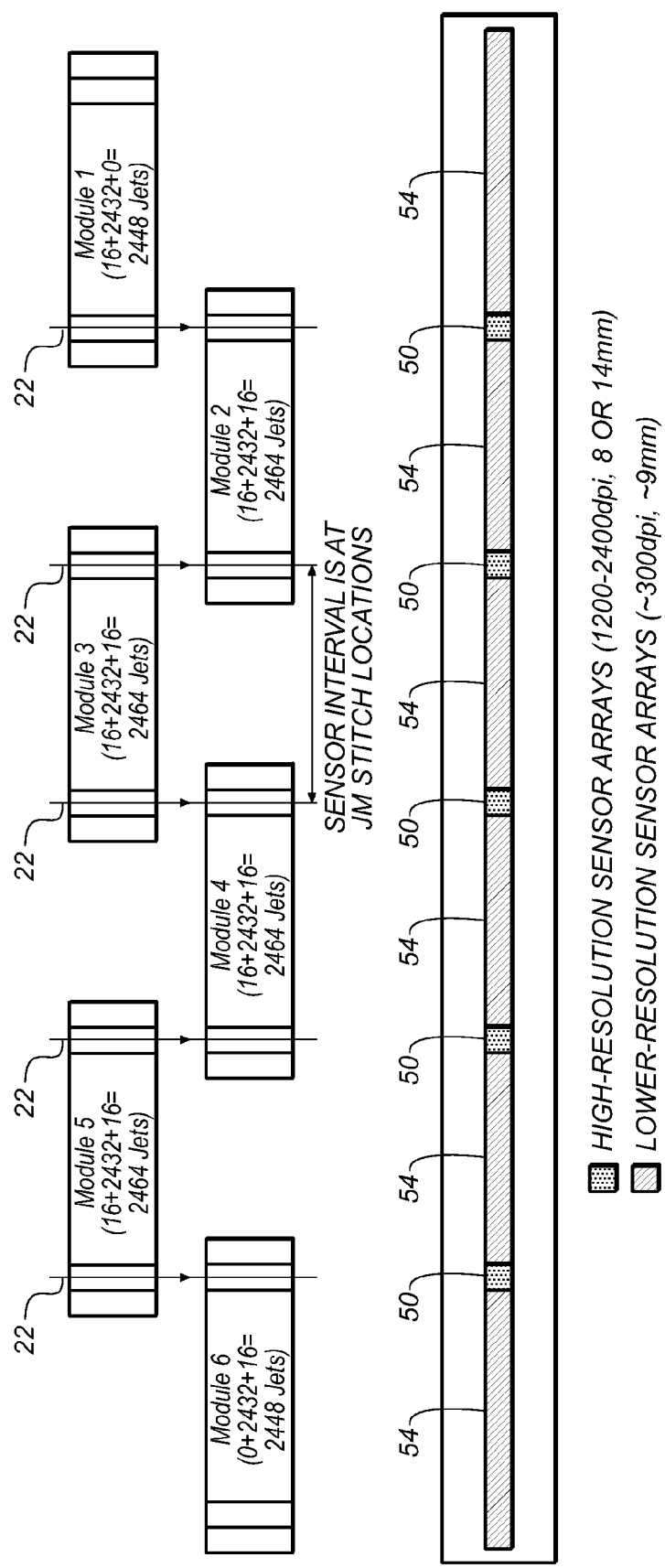
FIG. 5 is a plan view of the present invention showing an inline sensor array.

FIG. 4 is a schematic top view of the present invention with a Selfoc™ lens array 30. The separation between the two rows of CCDs is consistent with the field-of-view of the imaging optics such that both sensor rows can be imaged adequately with a common optics such as a Selfoc™ lens 40 made by Nippon Sheet Glass (NSG). The Selfoc lens has a plurality of gradient-index glass rods that are packed and arranged to produce a compact lens that can image the linear arrangement of CCD arrays in a 1:1 magnification ratio with a fixed working distance from the lens to the image plane In another embodiment, shown in FIG. 5, the higher 50 and lower 54 resolution arrays are arranged in a single, inline or collinear configuration on a common substrate 26. The higher-resolution sensors 50 are positioned at the jetting module stitch locations 22, but in a contiguous arrangement with the lower-resolution arrays.

Figure 6A:
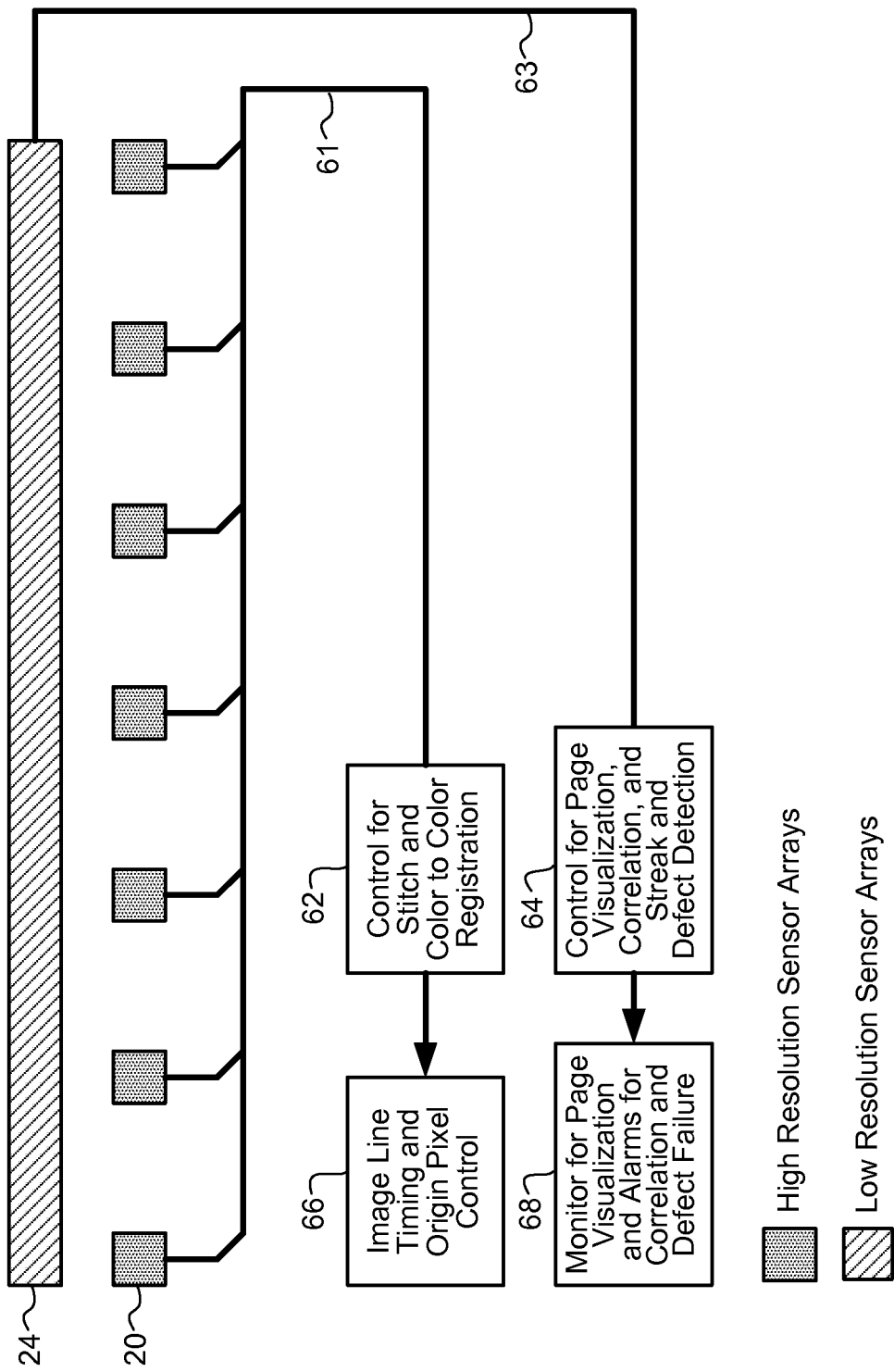
FIG. 6A is a schematic showing the data flow arrangement with respect to the multi-resolution image sensor with the low-resolution sensor offset from the high-resolution sensors.
Figure 6B:
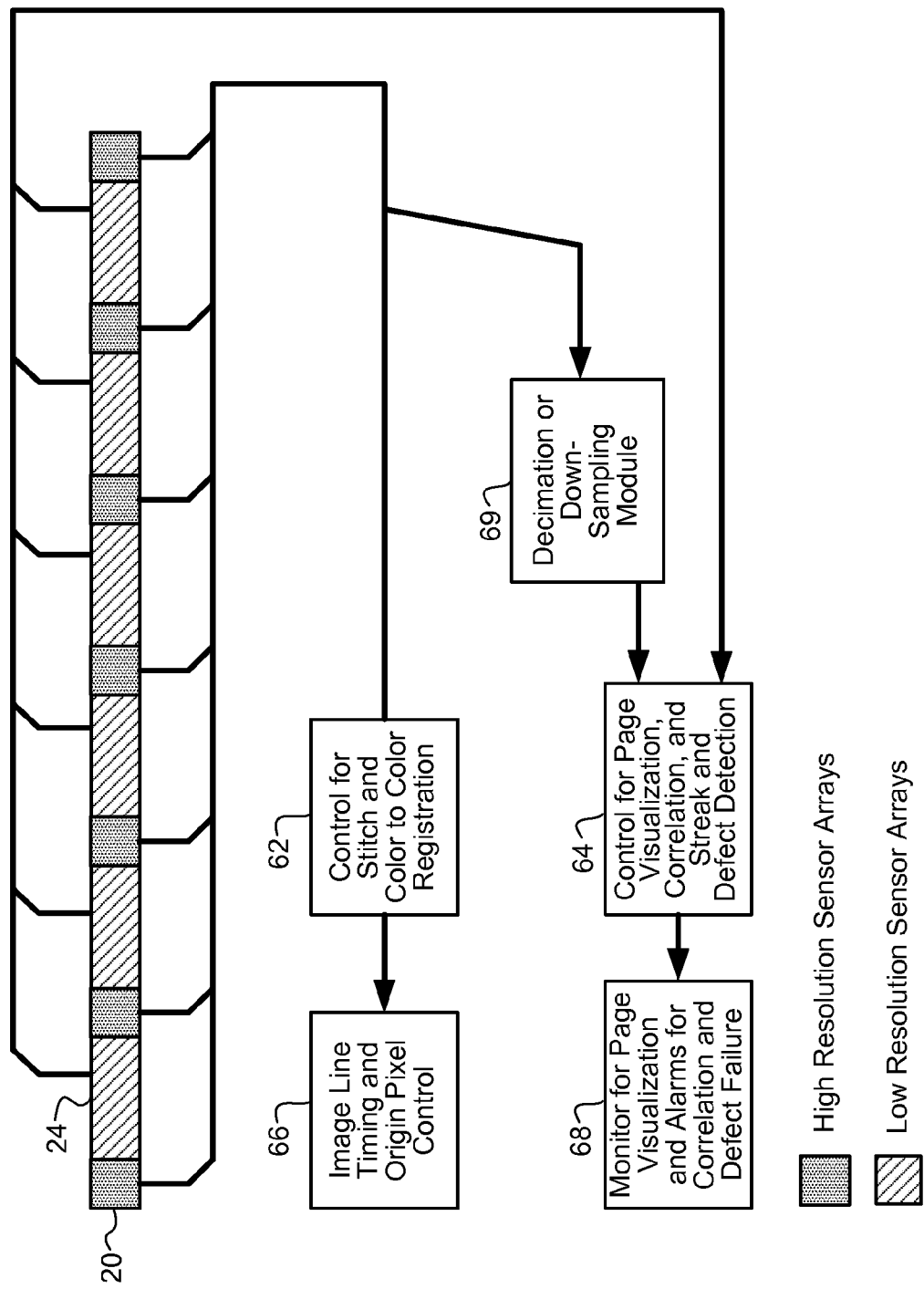
FIG. 6B is a schematic showing the data flow arrangement with respect to the multi-resolution image sensor with the high-resolution sensors positioned in-line with the low-resolution sensors.

As shown in FIG. 6A, each row of CCD arrays has a separate output channel that may also be segmented into multiple channels (61, 63) depending on the required bandwidth needed for the image-acquisition process. The CCD output channels are load-balanced to allow similar data-acquisition rates for each channel. The higher-resolution array channel 61 minimizes the data bandwidth by not having contiguous arrays along the entire imaging width. Conversely, the lower-resolution arrays provide continuous coverage, but also minimize data bandwidth requirements by having fewer pixels per unit length than the higher-resolution arrays. The multiple CCD output channels enable simultaneous scanning at full speed of both the higher-resolution arrays and the lower resolution arrays. FIG. 6B shows an alternative configuration where the high-resolution and low-resolution sensors are positioned in an inline or collinear fashion. The data channels are still arranged as the previous configuration shown in FIG. 6A.

The output from the CCD output channels are sent to signal-processing circuitry 34, shown in FIG. 1, that provides A/D conversion, combines and manipulates the data in each channel such that the output from the signal-processing block is usable image data for image analysis.

In the inline configuration of the higher and lower resolution arrays, appropriate signal processing 69, shown in FIG. 6B, is used to extract a lower-resolution image segment from the higher-resolution arrays and concatenate this image segment to the image data from the lower-resolution arrays.

The system controller 19, shown in FIG. 1, contains the functions needed for control for stitch and color-to-color registration 62, control for page visualization, page correlation, and streak and defect detection 64, image line timing and origin pixel control 66. The controller 19 also has a monitor for page visualization and a graphical display of alarms in the case of correlation and defect failures 68.

The invention has been described in detail with particular reference to certain preferred embodiments thereof, but it will be understood that variations and modifications can be effected within the scope of the invention.

PARTS LIST 10 multi-resolution imaging device (inkjet printer)
12 jetting module
14 multi-resolution image sensor (MRIS)
16 output print
18 sensor controller and signal processor
19 system controller
20 sensing elements (CCDs)
21 high-resolution sensing array(s) (CCD array)
22 jetting module stitch location(s)
24 low-resolution CCD sensing array(s)
26 substrate material
30 gradient-index lens array
32 illumination light source
34 sensor electrical interface and signal processing
40 top view of gradient-index lens array
50 high-resolution sensing array(s)
54 low-resolution sensing array(s)
61 channel
62 control for stitch and color-to-color registration function block
63 channel
64 control for page visualization, correlation and streak and defect detection function block
66 image line timing and origin pixel control function block
68 monitor for page visualization and alarms
68 decimation or down-sampling module function block

The invention claimed is:
1. A method of detecting and correcting imaging defects in a media printed on a high-speed multi-color printer comprising:
providing a multi-resolution image sensor comprising at least one high-resolution image sensor and at least one low-resolution image sensor wherein the high resolution image sensor has a higher resolution than the low resolution image sensor;
illuminating the media;

sensing images on the media at high resolution with the at least one high resolution sensor as it passes the multi-resolution image sensor;

transmitting an output of the high resolution sensor to a controller;

sensing images on the media at low resolution with the at least one low resolution sensor;

calculating a correction for stitch;

adjusting a timing of image data provided to image writers to align the inkjets to produce an optimal cross-track line;

providing a full page view from the low resolution sensor; and wherein a data rate of the high resolution sensor is limited.

2. The method of claim 1 wherein the low resolution sensor detects image artifacts.

3. The method of claim 1 wherein the high resolution sensor and the low resolution sensor are in a staggered configuration.

4. The method of claim 1 wherein the high resolution sensor and the low resolution sensor are in an in-line configuration.

5. The method of claim 1 wherein high resolution sensors are cascaded to provide a limited number of data channels.

6. The method of claim 1 wherein the printer is an inkjet printer.

7. The method of claim 1 wherein the image writer is an inkjet.

8. The method of claim 1 wherein the high resolution sensor array is not contiguous across the width of the multi-sensory imaging device.

9. A method of detecting and correcting imaging defects in a media printed on a high-speed multi-color printer having multiple jetting modules comprising:

printing with the multiple jetting modules, a print from the multiple jetting modules having transitions from one jetting module to another at one or more jetting modules stitch locations;

providing a multi-resolution image sensor, the multi-resolution image sensor comprising at least one high-resolution image sensor arrays and at least one low-resolution image sensor array, the high resolution image sensor array having a higher resolution than the low resolution image sensor array, and wherein the high-resolution image sensors array does not span the entire imaging width of the multi-resolution image sensor;

illuminating the media;

sensing portions of images on the media at high resolution with at least one high resolution image sensor as it passes the multi-resolution image sensor;

transmitting an output of the high resolution sensor array to a controller;

sensing images on the media at low resolution with at least one low resolution image sensor;

transmitting an output of the low resolution sensor array to a controller;

calculating a correction for stitching of the print from the multiple jetting modules using the output of the high resolution sensor array;

adjusting a timing of image data provided to image writers to align the inkjets to produce an optimal cross-track line; and providing a full page view at the resolution of from the low resolution sensor array.

10. A method of detecting and correcting imaging defects in a media printed on a high-speed multi-color printer comprising:

providing a multi-resolution imaging sensor;

illuminating the media;

sensing images on the media at high resolution with at least one high resolution sensor as it passes the multi-resolution imaging sensor;

transmitting an output of the high resolution sensor to a controller;

sensing images on the media at low resolution with at least one low resolution sensor;

calculating a correction for stitch;

adjusting a timing of image data provided to image writers to align the inkjets to produce an optimal cross-track line;

providing a full page view from the low resolution sensor; and wherein high resolution sensors are cascaded to provide a limited number of data channels.

* * * * *